(12) United States Patent
Maanoja et al.

(10) Patent No.: US 7,822,423 B2
(45) Date of Patent: Oct. 26, 2010

(54) PROVISION OF LOCATION INFORMATION

(75) Inventors: Markus Maanoja, Helsinki (FI); Petri Kokkonen, Espoo (FI)

(73) Assignee: Nokia Corporation, Espoo (FI)

( * ) Notice: Subject to any disclaimer, the term of this patent is extended or adjusted under 35 U.S.C. 154(b) by 105 days.

(21) Appl. No.: 10/495,275

(22) PCT Filed: Nov. 19, 2001

(86) PCT No.: PCT/IB01/02753

§ 371 (c)(1),
(2), (4) Date: Jul. 28, 2004

(87) PCT Pub. No.: WO03/045084

PCT Pub. Date: May 30, 2003

(65) Prior Publication Data

US 2005/0043038 A1    Feb. 24, 2005

(51) Int. Cl.
*H04W 24/00* (2009.01)
(52) U.S. Cl. ............... 455/456.1; 455/456.2; 455/456.3
(58) Field of Classification Search ............. 455/404.2, 455/414.2, 456.1, 456.3, 456.6, 466; 370/338, 370/469
See application file for complete search history.

(56) References Cited

U.S. PATENT DOCUMENTS

| | | | |
|---|---|---|---|
| 6,311,288 B1 * | 10/2001 | Heeren et al. ................... | 714/4 |
| 6,389,008 B1 * | 5/2002 | Lupien et al. ............... | 370/352 |
| 6,580,716 B1 * | 6/2003 | Falk et al. .................... | 370/396 |
| 6,707,813 B1 * | 3/2004 | Hasan et al. ................. | 370/356 |
| 6,711,126 B1 * | 3/2004 | Besset-Bathias ............ | 370/229 |
| 6,973,054 B2 * | 12/2005 | Bjelland et al. ............. | 370/310 |
| 7,027,828 B2 * | 4/2006 | Kim et al. .................... | 455/522 |
| 7,054,283 B2 * | 5/2006 | Carlsson et al. ............. | 370/328 |
| 2002/0006780 A1 * | 1/2002 | Bjelland et al. ............. | 455/406 |
| 2002/0098849 A1 * | 7/2002 | Bloebaum et al. ........... | 455/456 |
| 2002/0126701 A1 * | 9/2002 | Requena ..................... | 370/469 |
| 2002/0150091 A1 * | 10/2002 | Lopponen et al. ........... | 370/389 |
| 2002/0173329 A1 * | 11/2002 | Hwang ....................... | 455/522 |
| 2002/0176378 A1 * | 11/2002 | Hamilton et al. ............ | 370/328 |

FOREIGN PATENT DOCUMENTS

| | | |
|---|---|---|
| CN | 1308827 A | 8/2001 |
| DE | 19520 632 A1 | 12/1996 |
| JP | 2001-313972 A | 11/2001 |
| WO | WO 00/03556 | 1/2000 |
| WO | WO 00/35236 | 6/2000 |
| WO | 00/58750 A1 | 10/2000 |
| WO | WO 01/63960 A1 | 8/2001 |

* cited by examiner

*Primary Examiner*—Jean A Gelin
(74) *Attorney, Agent, or Firm*—Squire, Sanders & Dempsey, LLP

(57) ABSTRACT

In a telecommunication system communication to and/or from a user equipment is carried on a user plane and messages supporting the communication are carried on a control plane. Information supporting provision of information about the location of the user equipment is also arranged to be carried on the user plane to and/or from the user equipment.

31 Claims, 2 Drawing Sheets

PROVISION OF LOCATION INFORMATION

FIELD OF THE INVENTION

The present invention relates to provision of location information, and in particular to provision of location information by means of a telecommunication system.

BACKGROUND OF THE INVENTION

Various services can be provided for a user of a user equipment by means of a telecommunication system. Services that utilise information about the geographical location of a user in the service provisioning i.e. the so called location sensitive services are also known. Recent development in the field of mobile user equipment such as mobile telephones and other mobile stations has lead to arrangements wherein information about the current location of the mobile user equipment is determined and utilised in provision services for the mobile users.

A well known example of the communication systems providing mobility for the users is the public land line mobile network (PLMN), a cellular communication network being an example of the PLMN. Another example is a mobile communication system that is based, at least partially, on use of communication satellites. The skilled person is aware of the basic principles of a such communication systems. A mobile communication system typically operates in accordance with a given standard or specification which sets out what the various elements of the system are permitted to do and how that should be achieved. For example, the standard or specification may define if the user, or more precisely, user equipment or terminal is provided with a circuit switched service or a packet switched service or both. Communication protocols and/or parameters which shall be used for the connection are also typically defined. For example, the manner how communication shall be implemented between the user equipment and the elements of the communication network is typically based on a predefined communication protocol. In other words, a specific set of "rules" on which the communication can be based on needs to be defined to enable communication by means of the communication system.

A communication system needs to be able to provide various different functions in order be able to operate. These functions can be divided in different categories. A category comprises functions that relate to the actual carrying of the communication such as voice or multimedia or other data content in the system. Another category can be seen as being formed by control or management functions such as the control of various services and the actual communication. Signalling of messages associated with different functions is thus understood as being implemented on different planes. For example, control messages are communicated on a control plane and the actual communication is then transported on a user plane. The communication on the user plane is supported the signalling of the control messages on the control plane.

Typically the communication systems provide this by means of separate channels, e.g. by means of separated signalling and communication channels. Such arrangements are employed e.g. by signalling system 7 (SS7) core networks and Q.931/GSM/WCDMA subscriber access. Therefore the term "Signalling channel" may be used when referring to control plane communications. Similarly the term communication channel may be used when referring to user plane communications.

The various functions of the communication systems may have been developed quite independently from each other and may use different protocols in different communication systems. The standards and protocols define e.g. which plane shall be used for a certain purpose.

The mobile network apparatus and/or user equipment such as a mobile station can be employed for provision of information regarding the geographical location of the user equipment and thus the user thereof. A mobile user equipment and thus the user thereof can be positioned by various different techniques. For example, substantially accurate geographical location information that associates with a user equipment can be obtained based on the known satellite based GPS (Global Positioning System). More accurate location information can be obtained through a differential GPS. In another approach the cells or similar geographically limited radio access entities and associated controllers of the communication system are utilised in production of an estimate concerning the location of the mobile user equipment. To improve the accuracy of the location information the communication system may be provided with specific location measurement units (LMUs) that provide more accurate data or additional data concerning the location of a user equipment. It is also possible to conclude geographical location when the mobile user equipment is located within the coverage area of a visited or "foreign" network. The visited network may be made capable of transmitting the location of the mobile user equipment back to the home network, e.g. to support services that are based on location information or for the purposes of routing and charging. The production of data for the location determinations (such as various measurements and calculations) does not form an essential element of the present invention, and is thus not described in any greater detail herein.

A location service (LCS) entity may be employed in the provisioning of location information associated with a target user equipment for entities who have requested for such information (the clients). The LCS client may make use of that location information for various services/applications. The location service entity may implemented within the cellular system or connected thereto. The location service entity provided by the communication system may serve different clients via an appropriate interface.

Location data may be provided to the location service entity from various sources connected to the communication system. Location data may also be processed in the user equipment that is provided with appropriate processing capacity. The user equipment may then provide the location service entity or the client with processed data such as location co-ordinates.

The location information may be used for various purposes, such as for location of a mobile telephone that has made an emergency call, for locating vehicles or given mobile subscribers for commercial purposes and so on. In general, a client such as a user or entity wishing to receive location information regarding another user may send a request for such information to the location service provision entity. The location service provisioning entity will then process the request, obtain the required data and generate an appropriate response.

An example of the provision of the location information by a PLMN is described in more detail 3$^{rd}$ Generation Partnership Project (3GPP) technical specifications, see e.g. 3GPP TS 23.271 version 4.2.0, titled "Functional stage 2 description of LCS", June 2001.

According to the 3GPP specification a location service (LCS) server entity referred to as a Gateway Mobile Location Center (GMLC) is provided for managing the location services. The GMLC is for gathering and storing various data that may be used in provision of location information for the location service clients (LCS clients). The present location service (LCS) solutions employ control plane signalling channels for signalling messages that associate with the provisioning of the location services, such as for requests for location information, messages for conveying LCS assistance data and so on.

However, the inventors have found that the signalling of messages that associate with the provisioning of the location information may cause relatively high load on the control plane. This may be especially the case in the air interface between the mobile user equipment and the radio network servicing the mobile user equipment.

A further problem may arise in situations wherein by the communication system does not support provision of location information services or supports only certain types of services. In the prior art communication systems all elements in a LCS chain may need to support the provision of the location services. For example, involvement of all associated entities such as the GMLC (Gateway Mobile Location Center), HLR (Home Location Register), MSC/SGSN(s) (Mobile Switching Center/Serving GPRS Support Node) and other controllers is required. Support by the base station(s) and/or the user equipment may also be required.

This may be the case e.g. when new telecommunication standards or new type of services are introduced. A new communication system may be initially run based on substantially basic protocols and so on, are therefore may not be able to support any more "sophisticated services". For example, the recently launched GPRS (General Packet Radio Service) networks do not support provision of location information services for packet switched data communication sessions. A solution that overcomes also this problem might thus be appreciated by the service providers and users of the telecommunication system.

SUMMARY OF THE INVENTION

Embodiments of the present invention aim to address one or several of the above problems.

According to one aspect of the present invention, there is provided a method in a telecommunication system wherein communication to and/or from a user equipment is carried on a user plane and messages supporting the communication are carried on a control plane, and wherein information supporting provision of information about the location of the user equipment is carried on the user plane to and/or from the user equipment.

According to another aspect of the present invention there is provided a telecommunication system wherein communication to and/or from a user equipment is carried on a user plane and messages supporting the communication are carried on a control plane, the telecommunication system comprising an entity for provision of information about the location of the user equipment, the arrangement being such that information supporting the provision of said information about the location of the user equipment is carried on the user plane to and/or from the user equipment.

In a more specific form the supporting information comprises information generated by the user equipment for use by the network entity in provision of information about the location of the user equipment. The supporting information may comprise results of location measurements by the user equipment.

The supporting information may alternative or in addition comprise assistance data for use by the user equipment when determining information about the location thereof. The user equipment may compute the location thereof or perform at least one measurement based on the assistance data. The assistance data may be generated based on information that is provided by a location information provisioning unit. A rough location estimate of the user equipment may be determined and transmitted to the user equipment via the user plane.

Packet switching may be employed in the transportation of said supporting information on the user plane. The communication of said information may be accomplished by means of internet protocol (IP) session. At least a part of the supporting information may be carried to and/or from the user equipment by means of a packet data protocol (PDP) session, a short message service (SMS), or Abis/Iub interface, or a data call.

The address of the user equipment may be determined based on an indication of the identity of the user equipment. Said supporting information may be routed to the user equipment based on said address.

Said supporting information may be included in a user plane communication channel that has been established for other purposes or that has been established for communication of said supporting information.

The embodiments of the invention may reduce the amount of signalling of the control plane. Since the communication of the location information messages occurs via the user plane involvement of the telecommunication network elements such as the MSC, SGSN or RNC/BSC are not required. Although these elements may be required for establishment of the user plane there is no need for then to provide LCS specific features. The provisioning of the location information services may be provided independently from the operator of the network. That is, data associated with the provision of location information services may be transferred over the user plane connection without any proprietary connection to a specific network element. A network operator may control the location requests based on traditional approaches.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
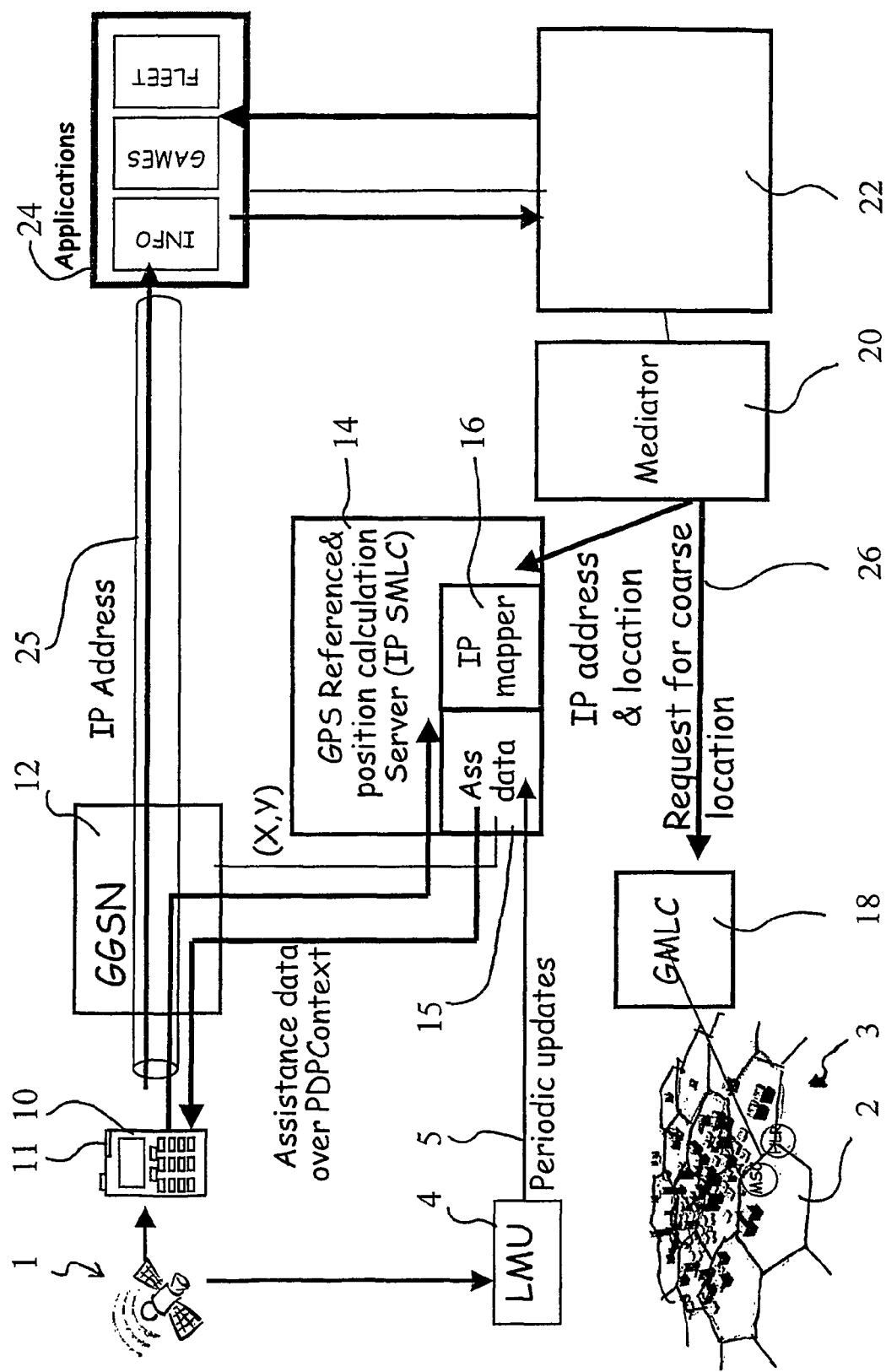
FIG. 1 shows one embodiment of the present invention.

Reference is made to FIG. 1 which is a simplified presentation of a cellular system to which the present invention may be applied. More particularly, FIG. 1 shows an arrangement the cellular system 3 provides radio coverage areas i.e. cells 2. Each radio coverage area 2 is typically served by a base station (not shown for clarity). It should be appreciated that one cell may include more than one base station site. A base station apparatus or site may also provide more than one cell. The shape and size of the cells 2 depend on the implementation and may be different from the illustrated shapes. The shape and size of the cells may also vary from cell to cell.

Each of the base stations is controlled by an access network controller. For example, a 3G radio access network controller (RNC) or a more conventional base station controller (BSC) of the GSM may be used for such purposes. The access network controller may be connected to appropriate core network entities of the cellular system, such as a MSC (mobile switching centre) and/or SGSN (serving general packet radio service support node), via a suitable interface arrangement. In order to ensure proper operation of the system, a control message that associates with a call to and/or from a user equipment needs typically to be communicated on the control plane to several network entities.

It shall be appreciated that the various elements associated with the radio access network and the communication system are shown and described in order to facilitate the understanding of the invention and do not form an essential element of the invention. Thus these are not explained in any greater detail herein.

User equipment such as mobile stations (MS) 10 is also shown. It shall be appreciated that a number of user equipment may be in communication via the cellular system although only one mobile user equipment is shown in FIG. 1 for clarity. Each mobile user equipment is arranged to transmit signals to and receive signals from the base station via a wireless interface.

The location of the mobile user equipment 10 may vary in time as the user equipment is free to move within the coverage area of a base station and also from a coverage area to another coverage area. As mentioned above, the modern communication systems are capable of providing information regarding the geographical location of a user equipment within the coverage area thereof. The geographical location may be defined, For example, on the basis of the position of the mobile station relative to the base station(s) of the mobile telecommunications network and/or based on information from a GPS system 1.

The geographical location of the user equipment may be defined, for example, in X and Y co-ordinates or in latitudes and longitudes. A possibility is to use the relation between defined radiuses and angles, e.g. based on the spherical coordinate system or alike. It is also possible to define the location of the base stations and/or mobile stations in vertical directions. For example, Z co-ordinate may be used when providing the location information in the vertical direction. The vertical location may be needed e.g. in mountainous environments or in cities with tall buildings.

In FIG. 1 the location service (LCS) client 24 is shown to comprise an entity providing various applications. The LCS clients is entitled to receive at least some degree of information concerning the location (or location history) of a target user equipment. A LCS client 24 can be any entity that makes use of the location information. The given examples include service applications such as pure location information services, games wherein location information can be utilised and fleet management applications. The service application may use the location information e.g. to enhance usability of the service or for content segmentation The client 24 may request for information from the communication system. The LCS client 24 can thus be seen as a logical functional entity that may make a request for location information of one or more target user equipment for what ever purposes.

The particular requirements and characteristics of a LCS Client are typically known to the location service server of the communication system by its LCS client subscription profile. Particular restrictions associated with each target user equipment may also be defined.

The LCS client 24 may be an entity that is external to the communication network. The LCS client may also be an internal client (ILCS) i.e. reside in any entity or node (including the mobile station) within the communication system.

The communication system may be provided with various different means for processing information gathered from the cells and/or some other parameters and/or for computing by processor means appropriate calculations for determining and outputting the geographical location of the target user equipment. The location information may be obtained by using one or more of the appropriate location techniques.

At least a part of the location information may be provided based on information provided by system that is separate from the communication system, such as by means of the Global Positioning System (GPS), differential GPS or similar.

Since there are various possibilities how to implement the location services in the cellular system and since the invention is not dependent on the used location determination technology, these are not be described in any greater detail herein.

The location service (LCS) functionality of the communication system is shown to be provided by several entities. The client may send the request to a specific location service server entity comprising components and bearers needed to serve LCS clients. The server entity may provide a platform which will enable the support of location based services in parallel with other telecommunication services such as speech, data, messaging, other teleservices, user applications and supplementary services. The LCS Server may thus provide the client, on request or periodically, the current or most recent geographic location (if available) of the target user equipment or, if the location fails, an error indication and optionally the reason for the failure.

FIG. 1 shows a Gateway Mobile Location Center (GMLC) entity 18 as an example of a conventional location service entity for gathering and storing data that is required for the provision of the location information. The GMLC node 18 is arranged to receive via appropriate interface means information concerning the location of the mobile user equipment from the cellular system 3. The GMLC location service node 18 is typically implemented in the core network. The GMLC may receive location information from the radio access network via appropriate controller entities such as the MSC and/or a SGSN by the appropriate interface means.

At least a part of the location data may be provided by specific GPS location measurement units. A GPS Location Measurement Unit (LMU) may be provided for collection of information such as timing difference information for use in Observed Timing Difference of Arrival (OTDOA) positioning method. Such a GPS LMU is often referred to as GPS reference receiver. The OTDOA is used by some communication systems such as those based on the WCDMA (wideband code division multiple access) for the network based location estimation.

The user equipment 10 may also be adapted to perform location measurements and/or calculations. The user equipment may accomplish this e.g. using an OTDOA capability thereof. The user equipment may also be a GPS enabled terminal. That is, the user equipment may be provided with a GPS receiver and means for processing GPS data.

The inventors have found that it is possible to use a user plane connection for transportation of messages that associate with the provision of location information services. For example, packet switched internet protocol (IP) user plane connection may be provided for such communication in parallel with another user plane communication media such as PDP (packet data protocol) context, data call, WLAN (Wireless LAN) communications and so on. Messages that relate to the provisioning of the location information services such as the location information requests, responses and assistance data may be delivered via an already active IP connection. Alternatively a new IP connection may be established for such messages e.g. in response to a location request.

Figure 2:
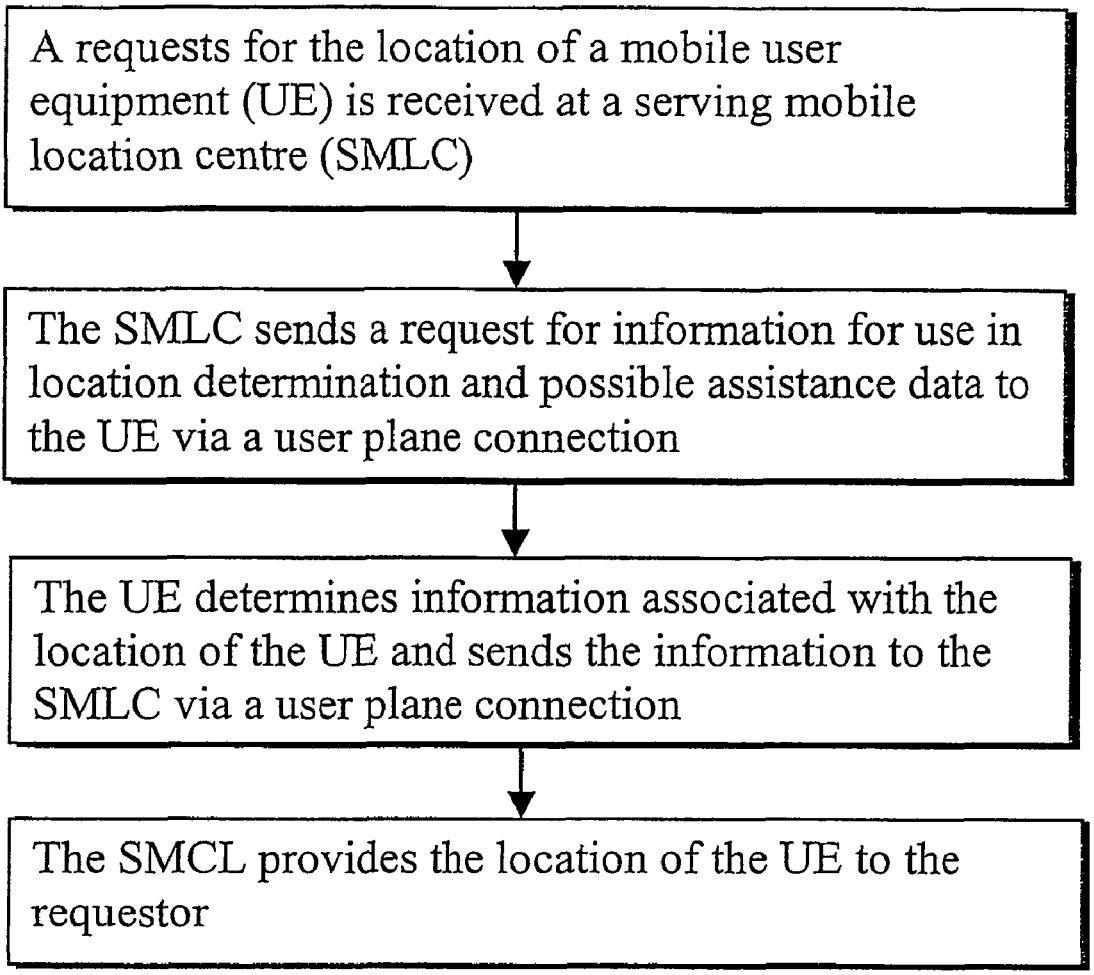
FIG. 2 is a flowchart illustrating the operation of one embodiment of the present invention.

FIG. 1 illustrates possible system architecture to implement user plane based positioning system. FIG. 2 show a flowchart for possible operation of the FIG. 1 system. In the system communication of "normal" or actual telecommunication traffic such as voice, data or multimedia content to and/or from the user equipment 10 is carried on a user plane. Signalling of messages that support the actual communication are then carried on a control plane. However, and as illustrated by FIG. 2, communication of information supporting the provision of information about the location of the user equipment is carried on the user plane between the user equipment and the serving mobile location center 14.

More particularly, a client application 24 may request for user position from a location services middleware entity 22. The Location middleware may be a mobile positioning enabling server responsible for functions such as user profiling (privacy checks), service screening, location data manipulation, charging, subscriber authentication, system control functions and so on. The server entity 22 may be provided in the core network side of the communication system. The server may communicate with the LCS application e.g. based on slightly modified logical interface (LIF) protocol which supports communication of IP address information. As shown by the arrow 26 the server entity 22 may also contact the GMLC functionality. Instances wherein this may be required are discussed later.

A user plane IP session may be established between the mobile user equipment 10 and any appropriate service. In FIG. 1 a session 25 is shown as being established between the user equipment and the location service applications 24. The IP session to be utilised in the provisioning of location information may also established between the user equipment 10 and an entity of the communication network that associates with the provisioning of the location information for the applications 24.

As mentioned above, user plane connections can be used instead of the control plane for the transfer of location information service specific data. Different transmission control protocol (TCP) connections of a single IP session can be used in the provisioning of the location information services. Alternatively a dedicated IP session can be created for the location services, for example, between the serving mobile location center (SMLC) and the user equipment.

In the embodiment illustrated by FIG. 1 the communication occurs between the user equipment 10 and an IP serving mobile location center (IP SMLC) 14. The IP SMLC entity 14 is provided for coordination and control of the operation. The IP SMLC 14 may include capabilities such as functions for handling Service Area Identities (SAI), Assisted GPS (A-GPS) and OTDOA. The IP SMLC may communicate with the user equipment to request terminal based positioning information, to request terminal measurements or to deliver LCS assistance data.

There are several ways how the IP SMLC may communicate with the user equipment. According to a preferred approach the user equipment is addressed by means of the IP address thereof. The IP message may also contain a predetermined TCP port number to indicate for the user equipment that the message is a LCS specific messages.

The IP serving mobile location center (IP SMLC) may use an existing IP connection to communicate with the user equipment for obtaining information required for the location calculations. The IP connection which is used to convey location related requests, responses and assistance data may be accessed via a gateway GPRS support node (GGSN) 12, mobile portal or similar gateway to the user plane. That is, the GGSN 12 may provide a path or gateway to access the pre-established IP connection. In practice this means that the IP SMLC 14 communicates with the user equipment via the GGSN 12. In accordance with an alternative a mobile portal provides instead of the GGSN the access point.

In order to be able to utilise an existing IP connection the IP SMLC has to know the IP address of the user equipment. Therefore the request message received from the client application should contain not only specified parameters (e.g. the mobile subscriber ISDN, requested accuracy and so on) but also the IP address of the user equipment. However, this is not always necessary, as will be explained later.

A mediator entity 20 may also be provided. The mediator entity provides dynamic selection and gateway functions. More particularly, the mediator entity may select if location information is to be provided by the telecommunication system or by another location information provision system. The mediator entity may include a selection logic e.g. whether location is fetched from a gateway mobile location center (GMLC) 18 of the communication network or from another entity via an IP connection. The method to be used in the provisioning of the location information may be selected based e.g. on the Quality of positioning (QoP) parameter included in the request or based on any other appropriate criteria. The determination may be made based on any appropriate method, such as by utilising information regarding the service area identity/visited MSC (SAI/V-MSC) by means of the GMLC 18 or based on the GPS information that is accessible by the SMLC 14.

The mediator entity 20 may also include IP connection management function.

A GPS receiver 11 may be integrated to the user equipment 10 in applications wherein the GPS is used for provision of the location information (e.g. the so called Assisted GPS (A-GPS) methods). In such applications assistance data may need to be communicated to enhance the GPS receiver functionality 11 of the user equipment 10. For example, sensitivity, coverage and response time may be enhanced by means of additional information assisting in the provisioning of the location data. The GPS assistance data for the A-GPS arrangement may be transferred to the user equipment using the IP connection without requirement for any of the elements of the communication network to get involved in the signalling. The A-GPS assistance data may be transferred over the IP connection without any proprietary connection to an assistance server. Since the user plane is used for communication of the control information proprietary interfaces are not necessarily required.

It should be noted that some of the assisted GPS procedures in the user equipment may require initial rough location information estimate, for example a cell level knowledge of the position of the user equipment. This information may be provided for the user equipment by means of the assistance data.

The GPS reference receiver 4 has the capability to produce the required GPS assistance data. The assistance data can be reported to the location service (LCS) entities using dedicated IP session established between the GPS reference receiver 4 and e.g. the IP SMLC.

Standard based protocol parameters may be used for the communications. For example, when collecting assistance data from the GPS reference receiver 4 or the user equipment 10 the parameters can be based on the 3GPP definitions.

Operation in accordance with an embodiment will be described in the following. The LCS application 24 requests position i.e. geographical location information from the location services middleware 22. The middleware 22 may then accomplish e.g. the screening and/or privacy functions. The request may then be routed to the mediator function 20.

If the Quality of positioning (QoP) requirement of the request is high and if the subscriber profile indicates that the user equipment 10 is a GPS capable terminal, the request may be handled as a GPS location service (LCS) request. For the GPS LCS request the following decisions and actions may be taken.

If the last known location of the user equipment is determined as being one that can be used for responding the request, the request is passed further to an IP address mapping entity 16 of the IP SMLC 14. The last known location may be used as a rough location estimate to be provided for the user equipment.

The IP address mapping entity 16 is for retrieving IP addresses of user equipment. The mapping entity 16 may be implemented at the IP SMLC 14 or as a part of the mediator 20, or in any other appropriate entity of the network.

The LCS application 24 may give various identities (ID's) when sending the initial location request. If the IP address of the user equipment is given (e.g. the LCS application knows the IP address of the user equipment because there may be a connection between the application and the user equipment), there is no need for any IP mapping proceedings. However, processing such as validation may be required. Identity such as 'Nick name' e.g. may be used when the communication network wishes to hide the actual identity of the subscriber from the LCS application. In this case the network has the required knowledge for MSISDN—IP Address—nick name mapping. (MSISDN=mobile subscriber international ISDN number). For example, the IP mapping function may use the relation database (e.g. a radius proxy server) to map the nick name received from application to an IP address of the user equipment. MSISDN may also be used, e.g. when the LCS application has no connection to the terminal but knows the subscriber number, for example a service such as "Find where my wife is". In this case the IP mapping function may map the MSISDN to a respective IP address e.g. by means of a database (not shown). A new PDP context may also be created to the user equipment to get the MSISDN. The short message service (SMS) may also be used for this purpose.

It shall be appreciated that these functions may be done by the IP. SMLC or the Mediator entity 20 depending where IP mapping function is located. The mapping function may also be a shared functionality.

It may be determined that the last known location is too old for provision of a rough location estimate. In such case a new "rough" location estimate (based on Cell ID (CI) or service area identity (SAI), for example) may be requested from the GMLC 18 or any other appropriate element of the LCS system of the communication network. The request may then be passed to the IP address mapping entity with a rough location estimate from the GMLC. The "rough" estimate/last known location from the GMLC 18 is then used to find correct assistance data set.

The IP SMLC 14 is thus made aware of the approximate position of the target user equipment and IP and/or MSISDN-addresses. The IP SMLC 14 may use the approximate position to select a correct set of GPS assistance data, e.g. for selection of only those GPS satellites that are visible for the user equipment at the current location. The mobile user equipment may also use the rough location estimate in generation of a correct E-OTD/OTDOA assistance data set regarding e.g. the base stations which the user equipment shall to listen and so on. The user equipment may also use the rough estimate otherwise to enhance the GPS receiver functionality thereof.

The assistance data and location request may be sent to the user equipment on top of an IP session (e.g. as a PDP context) or as a short message service (SMS) message. The SMS messages may be used e.g. when the user equipment is communicating with elements of a Circuit Switched network.

It may also be such that the IP address of the user equipment 10 is not known and/or cannot be found by the mapping function. If IP address is not known then the Mediator or the IP SMLC may try to establish a dedicated PDP context (a form of IP session) or a SMS connection to the user equipment. In such case the request may be passed to the GMLC 18. The GMLC may then return the current location of the target user equipment. It is thus possible to fetch the location from the GMLC 18 if either of these communications cannot be established, or if they are not otherwise feasible or desired. The GMLC response may then be used as a final location estimate.

The data format may be as specified in the 3GPP radio resource control (RRC) protocols. The SMLC 14 may then collect the assistance data from the GPS LMUs i.e. reference receivers 4. The data format of the assistance data delivery may be, for example, as specified in the 3GPP node B application part (NBAP) definitions The mediator 20 or the IP SMLC itself 16 may handle the connection control for the communication between the user equipment 10 and the IP SMLC 14 and the dataflow between these entities.

The user equipment 10 may calculate the location thereof using the assistance data from the IP SMLC 14. The user equipment sends the calculated location co-ordinates (x,y) back to the mediator which may then pass the co-ordinates (x,y) to the LCS application entity 24.

GPS reference data collection can be done separately in background even periodically. Reference data may be collected from GPS reference receivers. A GPS reference receiver is used for receiving "raw GPS data" from the GPS satellites. This raw data is then transferred to the IP SMLC for further processing. The IP SMLC may, for example, take off unnecessary information such as check sums, headers and so on from the raw data received from satellites to generate the actual assistance data.

It is also possible to utilise for example "secondary PDP context" procedures which enable related PDP sessions to be established for multiple parallel sessions. This enables for example efficient LCS charging and Quality of Service (QoS) management and so on. The secondary PDP context may be used, for example, to enable feasible charging of assistance data and data transfer.

A parallel "pipe" may be established for the provision of the LCS e.g. in instances wherein the main PDP context is for transportation of Email. In such a case substantially low QoS and best effort techniques may be used. However, the LCS may require better QoS & tariffs, and thus a parallel communication pipe.

In accordance with an embodiment the IP SMLC 14 is provided information such as GPS data received from the satellites 1. This data may be manipulated to produce GPS assistance data to enhance terminal's GPS functionality.

Another embodiment provides a combined OTDOA/E-OTD (enhanced observed time difference of arrival) and A-GPS functionality wherein base station synchronization difference information is required. The IP SMLC may need to know the base station synchronisation differences to generate E-OTD/OTDOA assistance data and calculate the position of the user equipment by means of these methods. This synchronisation difference information may be collected by the LMU 4. This information is needed to compensate clock differences of signals measured for the OTDOA method.

It shall be appreciated that in addition to the above referenced GPS, D-GPS or the OTDOA/E-OTD methods, the location of the user equipment may be determined based on information from any appropriate location information provision mechanism. For example, mechanism such as those that are based on use of parameters such as cell identity (CI), service area identity (SAI), timing advance (TA), round trip time (RTT) and so on may be used either alone or in any combination.

These data segments may be collected by the GPS LMU element 4. The GPS LMU element may then report the data using pre-established TCP/IP connection or any other appropriate method such as the SMS, data call, NBAP/LLP (LMU-LCS protocol) signalling and so on between the IP SMLC and GPS LMU.

It shall be appreciated that although the above describes the invention in with reference to IP session, this is not the only possibility for the user plane communication. The communication may occur, for example, based on signalling via Abis/lub interface, PDP context, short message service (SMS), data call and so on.

It shall also be appreciated that the TCP/IP based connection or other appropriate connection 5 used for communication between the GPS LMU 4 and the IP SMLC 14 may be independent of the radio access network (e.g. UTRAN) 3 and also the user plane connection provided for the user equipment 10. Therefore messages on the TCP/IP connection 5 can be transported over an independent communication media such as the Ethernet, WLAN, Bluetooth™, GPRS/NCDMA PDP context and so on. This approach allows easy configuration and independency of site locations.

Solution offers vendor independent quick time-to-market solution without adding any proprietary function. The required communication connections may established in a normal per se standardised ways for the service provisioning application 24 invoking a location request.

The basic communication parameters may be based on 3GPP definitions. This is especially applicable to LCS application interfaces which may be the same as in the standardized GMLC based solutions. Also the GPS LMU and user equipment parameter definitions may be based on the standards. Therefore even though the solution is proprietary this approach provides easy user equipment adaptation and very flexible evolution to standardized solutions.

It should be appreciated that whilst embodiments of the present invention have been described in relation to user equipment such as mobile stations, embodiments of the present invention are applicable to any other suitable type of user equipment.

It should be appreciated that even though the exemplifying telecommunications network shown and described in more detail uses the terminology of the third generation (3G) UMTS (Universal Mobile Telecommunications System) public land mobile network (PLMN), the proposed solution can be used in any system providing mobile communications for users and some kind of location information service. Examples of other telecommunications systems include, without limiting to these, standards such as the GSM (Global System for Mobile communications) or various GSM based systems (such as GPRS: General Packet Radio Service), AMPS (American Mobile Phone System) or DAMPS (Digital AMPS), IMT 2000 (International Mobile Telecommunications system 2000), i-phone and so on.

Since the communication of the location information services messages occurs via the user plane involvement of the core telecommunication network elements such as the MSC, SGSN or RNC/BSC is not required. Therefore the provisioning of the location information services may be made operator independent. That is, data associated with the provision of location information services may be transferred over the IP connection without any proprietary connection to a network element such as an assistance server.

The use of IP data carriers is believed to be feasible since a substantial portion of the LCS service provisioning is done in connection with IP sessions, e.g. during browsing or when in data communication with another party. This makes use of the user plane communication path feasible for various applications. The user plane IP connection that is to be used for communication of LCS data to and from the user equipment may be a connection that has already been established between the user equipment and a LCS application for other purposes, e.g. for browsing of location services.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   sending to a user equipment and/or receiving from a user equipment communication on a user plane;
   sending to said user equipment and/or receiving from said user equipment messages supporting the communication on a control plane; and
   sending to said user equipment support information from a mobile location center implemented in a core network, said support information supporting provision of information about the location of the user equipment on a user plane communication channel established for communication of said support information, wherein the support information comprises a message generated by said mobile location center, and wherein the support information comprises assistance data for use by the user equipment when determining information about the location of the user equipment.

2. The method as claimed in claim 1, wherein the assistance data is for use by the user equipment when computing the location thereof or performing at least one measurement.

3. The method as claimed in claim 1, wherein the assistance data is based on information said mobile location centre of the communication system has received from a location information provisioning unit.

4. The method as claimed in claim 1, further comprising:
   employing packet switching for transportation of the support information on the user plane.

5. The method as claimed in claim 4, further comprising:
   accomplishing communication of said support information using an internet protocol session.

6. The method as claimed in claim 5, further comprising:
   using a transmission control protocol connection of the internet protocol session.

7. The method as claimed in claim 1, further comprising:
   sending at least a part of the support information to the user equipment using a packet data protocol session.

8. The method as claimed in claim 1, further comprising:
   sending at least a part of the support information to the user equipment using a short message service.

9. The method as claimed in claim 1, further comprising:
   sending at least a part of the support information to the user equipment using an Application Binary Interface Standard/Iub interface.

10. The method as claimed in claim 1, further comprising: sending at least a part of the support information to the user equipment using a data call.

11. The method as claimed in claim 1, further comprising: determining the address of the user equipment based on an indication of the identity of the user equipment; and
routing said support information to the user equipment based on said address.

12. The method as claimed in claim 11, wherein the determining the address comprises determining an internet protocol address of the user equipment.

13. The method as claimed in claim 1, further comprising: transmitting a rough location estimate of the user equipment to the user equipment via the user plane.

14. An apparatus, comprising:
at least one memory including computer program code,
at least one processor,
the at least one memory and the computer program code being configured to, with the at least one processor, cause the apparatus at least to
send to a user equipment and/or receive from a user equipment communication on a user plane;
send to said user equipment and/or receive from said user equipment messages supporting the communication on a control plane; and
send to said user equipment support information from a mobile location center implemented in a core network, said support information supporting provision of information about the location of the user equipment on a user plane communication channel established for communication of said support information, wherein the support information comprises a message generated by said mobile location center, and wherein the support information comprises assistance data for use by the user equipment when determining information about the location of the user equipment.

15. The apparatus of claim 14, wherein the assistance data is based on information said mobile location center has received from a location information provisioning unit.

16. The apparatus of claim 14, wherein the apparatus is configured to send said support information on said user plane communication channel based on packet switching.

17. The apparatus of claim 16, wherein the apparatus is configured to send said support information on said user plane communication channel using an internet protocol session.

18. The apparatus of claim 14, wherein the apparatus is configured to send at least a part of the support information to the user equipment on said user plane communication channel using a packet data protocol session.

19. The apparatus of claim 14, wherein the apparatus is configured to send at least a part of the support information to the user equipment on said user plane communication channel using a short message service.

20. The apparatus of claim 14, wherein the apparatus is configured to send at least a part of the support information to the user equipment on said user plane communication channel using an Abis/Iub interface.

21. The apparatus of claim 14, wherein the apparatus is configured to send at least a part of the support information to the user equipment on said user plane communication channel using a data call.

22. The apparatus of claim 14, wherein the processor configured to cause the apparatus to determine the address of the user equipment based on an indication of the identity of the user equipment, said support information being configured to be routed to the user equipment based on said address.

23. The apparatus of claim 14, wherein the processor is configured to cause the apparatus to determine the location of the user equipment based on information from at least one of the following location information provision mechanisms: global positioning system; differential global positioning system; observed time difference of arrival; enhanced observed time difference of arrival; cell identity; service area identity; timing advance; or routing trip time.

24. A method, comprising:
receiving at a user equipment and/or sending from a user equipment communication on a user plane;
receiving at said user equipment and/or sending from said user equipment messages supporting the communication on a control plane; and
receiving at said user equipment support information from a mobile location center implemented in a core network, said support information supporting provision of information about the location of the user equipment on a user plane communication channel established for communication of said support information, wherein the support information comprises a message generated by said mobile location center, and wherein the support information comprises assistance data for use by the user equipment when determining information about the location of the user equipment.

25. The method of claim 24, further comprising determining information about the location of the user equipment based on the assistance data.

26. The method of claim 25, further comprising:
computing the location of the user equipment or performing at least one measurement based on the assistance data.

27. An apparatus, comprising:
at least one memory including computer program code,
at least one processor,
the at least one memory and the computer program code being configured to, with the at least one processor, cause the apparatus at least to
receive at a user equipment and/or send from a user equipment communication on a user plane;
receive at said user equipment and/or send from said user equipment messages supporting the communication on a control plane; and
receive at said user equipment support information from a mobile location center implemented in a core network, said support information supporting provision of information about the location of the user equipment on a user plane communication channel established for communication of said support information, wherein the support information comprises a message generated by said mobile location center, and wherein the support information comprises assistance data for use by the user equipment when determining information about the location of the user equipment.

28. The apparatus of claim 27, wherein the apparatus is further configured to determine information about the location of the user equipment based on the assistance data.

29. The apparatus of claim 28, wherein the apparatus is configured to compute the location of the user equipment or perform at least one measurement based on the assistance data.

30. A computer-readable medium encoded with instructions that, when executed on a computer perform a process, the process comprising:

sending to a user equipment and/or receiving from a user equipment communication on a user plane;

sending to said user equipment and/or receiving from said user equipment messages supporting the communication on a control plane; and sending to said user equipment support information from a mobile location center implemented in a core network, said support information supporting provision of information about the location of the user equipment on a user plane communication channel established for communication of said support information, wherein the support information comprises a message generated by said mobile location center, and wherein the support information comprises assistance data for use by the user equipment when determining information about the location of the user equipment.

31. A computer-readable medium encoded with instructions that, when executed on a computer perform a process, the process comprising:

receiving at a user equipment and/or sending from a user equipment communication on a user plane;

receiving at said user equipment and/or sending from said user equipment messages supporting the communication on a control plane; and receiving at said user equipment support information from a mobile location center implemented in a core network, said support information supporting provision of information about the location of the user equipment on a user plane communication channel established for communication of said support information, wherein the support information comprises a message generated by said mobile location center, and wherein the support information comprises assistance data for use by the user equipment when determining information about the location of the user equipment.

* * * * *